(12) United States Patent
Rabinkin

(10) Patent No.: US 6,200,690 B1
(45) Date of Patent: Mar. 13, 2001

(54) NICKEL-CHROMIUM-BASED BRAZING ALLOYS

(75) Inventor: Anatol Rabinkin, Morris Plains, NJ (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 08/920,416

(22) Filed: Aug. 29, 1997

Related U.S. Application Data

(63) Continuation of application No. 08/645,986, filed on May 14, 1996, now abandoned, which is a continuation-in-part of application No. 08/447,001, filed on May 22, 1995, now abandoned.

(51) Int. Cl.⁷ .............................. B32B 15/01; C22C 45/04
(52) U.S. Cl. ........................ 428/606; 428/680; 428/685; 148/403; 420/442; 420/452; 420/453; 228/262.31
(58) Field of Search ..................................... 148/403, 427; 420/442, 452, 453, 459; 228/262.3, 262.31; 428/606, 680, 684, 685

(56) References Cited

U.S. PATENT DOCUMENTS

| | | | |
|---|---|---|---|
| 4,148,973 | * | 4/1979 | Sexton et al. ........................ 148/403 |
| 4,302,515 | * | 11/1981 | DeCristofaro et al. .............. 148/403 |
| 4,543,135 | * | 9/1985 | Bose et al. ........................... 148/403 |
| 4,745,037 | * | 5/1988 | DeCristofaro et al. .............. 148/403 |

* cited by examiner

Primary Examiner—George Wyszomierski
(74) Attorney, Agent, or Firm—Charlotte Copperthite

(57) ABSTRACT

A nickel-chromium-based brazing alloy has a composition consisting essentially of about 9.5 to about 16.5 atom percent chromium, 0 to about 5 atom percent iron, about 10 to about 15 atom percent silicon, about 6 to less than 7 atom percent boron, and 0 to about 5 atom percent molybdenum, the balance being essentially nickel and incidental impurities. The alloy is especially suited for use as a brazing filler metal for joining stainless steel and/or superalloy at temperatures above 1100 degree(s) C. Such a filler metal has a thickness ranging from about 65 to 100 micrometers and a width ranging from 100 to 250 millimeters and more. Honeycomb structures and thin corrugated fin/plate structures particularly suited for use in manufacture of plate-type heat exchangers formed at least in part from stainless steels and/or superalloys are brazed using a unique process. The process is characterized by a long holding time at brazing temperature, and combines brazing and diffusion annealing in one technological step. Brazements produced by the process exhibit complete disappearance of central eutectic line and brittle intermetallic compounds from the joint microstructure. The brazements further exhibit joint ductility, as well as high strength and fatigue and corrosion resistance.

10 Claims, 1 Drawing Sheet

NICKEL-CHROMIUM-BASED BRAZING ALLOYS

CROSS-REFERENCE TO RELATED APPLICATIONS

This application is a continuation of application Ser. No. 08/645,986 filed May 14, 1996, now abandoned, which is a continuation-in-part of Ser. No. 08/447,001 filed May 22, 1995 now abandoned.

BACKGROUND OF THE INVENTION

1. Field of the Invention

This invention relates to brazing filler metals composed of nickel-chromium-based alloys containing transition metals such as iron and molybdenum and certain metalloids; and more particularly to multicomponent alloys containing nickel, chromium, iron, molybdenum, boron, and silicon, which are particularly useful for brazing metals at high temperatures to produce high strength and corrosion-resistant brazements

2. Description of the Prior Art

Brazing is a process for joining metal parts, often of dissimilar composition, to each other. Typically, a brazing filler metal that has a melting point lower than that of the parts to be joined is interposed between the parts to form an assembly. The assembly is then heated to a temperature sufficient to melt the brazing filler metal. Upon cooling, a strong, preferably corrosion resistant, joint is formed.

One class of products produced by brazing processes is plate-type heat exchangers. The plate-and-frame heat exchangers have been widely used in food, chemical, aerospace and other process industries. A standard plate-and-frame heat exchanger consists of a number of alternating corrugated/flat metal sheets kept in tight, sealed contact with each other using gaskets or being brazed. In general, brazed heat exchangers are stronger and more suitable for high temperature/high pressure applications than those with the gasket-type of sealing. These plates are mounted on a frame that may be free-standing or are built into a supporting structure. An elaborate system of channels is formed by these plates in which two, one hot and one cool, liquid and/or gas media flow separately exchanging heat and thus saving energy. Fully brazed units have been used for some time with mostly noncorrosive mediums, such as CFC, etc. Therefore, the brazing has been carried out using stainless steel as a base metal and mostly copper as a filler metal. Recently, because of the general gradual withdrawal of CFC as a refrigerant and replacement of it with preferably ammonia and also the improving of energy savings in some new application area, there is a great need for development of noncorrosive stainless steel brazes which can withstand corrosive effects of ammonia and, at the same time, some other even more potent than ammonia mediums including sea water, various acid solution, etc. Such alloys should be compatible with stainless steel base metals and, therefore, nickel-chromium-based filler metals are the best potential choice for such an application. Moreover, of particular importance for heat exchanger performance is the ability of their brazed component to resist fatigue appearing due to alternating thermal stresses. Therefore, heat exchanger brazes should be free from any brittle phases in order to provide high ductility and strength combined with high corrosion resistance. Nickel-chromium-based filler metals containing boron and silicon, when crystallizing from the liquid state, form the eutectic mixture of solid solution and intermetallic solid phases. It is well known that the presence of intermetallic phases rich in boron and silicon results in formation of brazes which are brittle, poorly resistant to fatigue, and susceptible to corrosion. Conventional brazing is typically carried out with a holding time at brazing temperature of about 15–30 min. Such holding time is insufficient to deplete the braze of silicon and boron by dissolving these components into adjoining base metal parts of sufficient thickness to a degree that the intermetallic phases cannot be formed. The most natural way to accomplish such depletion of brazes is to increase the brazing temperature and to extend the holding time in a high temperature range during the brazing operation. At the same time, it should be kept in mind that the dissolution of silicon and boron in base metal components should not result in the base metal brittleness due to formation of intermetallic phases in the base metal itself.

Brazing filler metals consisting of nickel-chromium-based alloys have been developed which exhibit high temperature strength and good corrosion resistance. Such alloys have been disclosed, for example, in U.S. Pat. Nos. 4,184,973, 4,302,515, 4,745,037, and 4,543,135. The alloys disclosed in these patents, however, each exhibit drawbacks which make them unsuitable for brazing products which require prolonged service life in highly corrosive environments or having a sufficient thickness to provide sufficient braze cross-section with high effective joint strength. For example, the alloy species disclosed in U.S. Pat. Nos. 4,148,973, 4,302,515 and 4,745,037 contain boron in substantial amount(s) (at least 9 to 18 atom percent). It is well known that boron diffuses extensively out of the joint area into to stainless steel and superalloy base metals when subjected to brazing at very high temperatures and forms intermetallic boride phases detrimental to base metal mechanical fatigue and corrosion resistance. Specifically, boron, with its small atomic radius, diffuses along grain boundaries forming therein intermetallic borides and resulting in brittle fracture under loading at elevated temperatures. Therefore, alloys containing a large amount of boron are not suitable for brazing products designed to withstand high temperature, high stress and high fatigue environments, i.e., for example, stainless steel and/or superalloy honeycomb structures employed in airfoils and plate-type heat exchangers subjected to variable high pressure/high temperature conditions. Moreover, this is of the critical importance for structures in which the thin gage (about 0.1–0.05 mm thick) base metal components are used.

Regarding the quaternary nickel-chromium-silicon-boron alloys disclosed in U.S. Pat. No. 4,543,135, these alloys have large concentrations of nickel and chromium, moderate concentration of silicon and small concentration of boron. Although the problem associated with boron is mostly avoided, the high chromium content results poor ribbon ductility. Specifically, these alloys cannot be produced as a wide, ductile foil having thickness of about or greater than 25 $\mu$m. It is well known from the existing art that chromium, when compared with such elements as nickel, palladium, and iron, decreases amorphability of alloys containing transition elements and metalloids such as boron and silicon. The low maximum thickness (about 25 $\mu$m) and maximum width ($\leq$100 mm) at which the 19% chromium containing brazing foil retains ductility, causes joints produced from this ribbon to be thin and weak. Moreover, the alloys disclosed by U.S. Pat. Nos. 4,148,973, 4,302,515, and 4,543,135 contain no molybdenum. The only molybdenum containing species taught by U.S. Pat. No. 4,745,037 requires the presence of 20 atom percent cobalt, which element is expensive and significantly increases the cost of the foil. Moreover, the molybdenum containing species taught by U.S. Pat. No. 4,745,037 requires 16 atom percent boron, which would further increase the cost, increase erosion of the base metal, and decrease the strength and corrosion resistance of the joint. In direct contradistinction with the teachings of these patents, it has been found that the presence of molybdenum with from 6 to less than 7 atom percent boron, greatly improves corrosion resistance of nickel-chromium-based alloys to solutions of halogen salts and to pitting in seawater. This improved corrosion resistance is of specific importance in heat exchanger applications in which water is used as a cooling medium or when water is preheated before being converted to steam in power plants to save energy. For the above reasons, the alloys taught by prior art workers are not effective for use in brazing products to be employed in high temperature, high stress and high fatigue environments, such as heat exchanger applications.

Accordingly, there remains a need in the art for improved brazing filler materials suitable for brazing stainless steels and superalloys at high temperatures. There remains further a need for an improved brazing process productive of brazements which exhibit optimal microstructure and thickness, and which retain high strength and high corrosion resistance at elevated temperatures over prolonged periods of time.

SUMMARY OF THE INVENTION

The present invention provides an improved brazing filler metal which possesses high temperature melting characteristics and low erosion of base metal parts. Brazements produced using such filler metal have substantially uniform microstructure and possess high strength at elevated temperatures. In addition, the brazements exhibit high corrosion resistance in various corrosive environments. Brazing alloys particularly suited for use as the filler metal consist essentially of nickel-chromium-based alloys having a composition defined by the following formula:

$$Cr_a Fe_b Si_c B_d Mo_e Ni_{balance},$$

where the subscripts "a", "b", "c", "d", and "e" are in atomic percent, "a" ranges from about 9.5 to about 16.5, "b" ranges from 0 to about 5, "c" ranges from about 10 to about 15, "d" ranges from about 6 to less than 7, "e" ranges from 0 to about 5 and the balance is nickel plus incidental impurities.

In addition, the invention provides brazing filler metals in the form of homogeneous ductile foils which are composed of metastable materials preferably having at least 80% amorphous structure.

Further, in accordance with the present invention, an improved process is provided for joining stainless steels and/or superalloys honeycomb structures and plate heat exchangers, which process comprising the steps of:

a) interposing a filler metal of the above described composition between base metal parts to form an assembly, heating the assembly to a temperature about to 50° C. above the liquidus temperature of the brazing filler metal and holding at this temperature for a time sufficient to dissolve intermetallic brittle phases formed during brazing, and afterwards cooling to about 1100° C. and holding at said temperature for a time sufficient for postbrazing annealing of said structure; and b) cooling the assembly to provide a brazed honeycomb or a plate-type heat exchanger product.

BRIEF DESCRIPTION OF THE DRAWING

This invention will be more fully understood and further advantages will become apparent when reference is made to the following detailed description of the preferred embodiments of the invention and the accompanying drawing, in which.

DETAILED DESCRIPTION OF THE INVENTION

Figure 1:
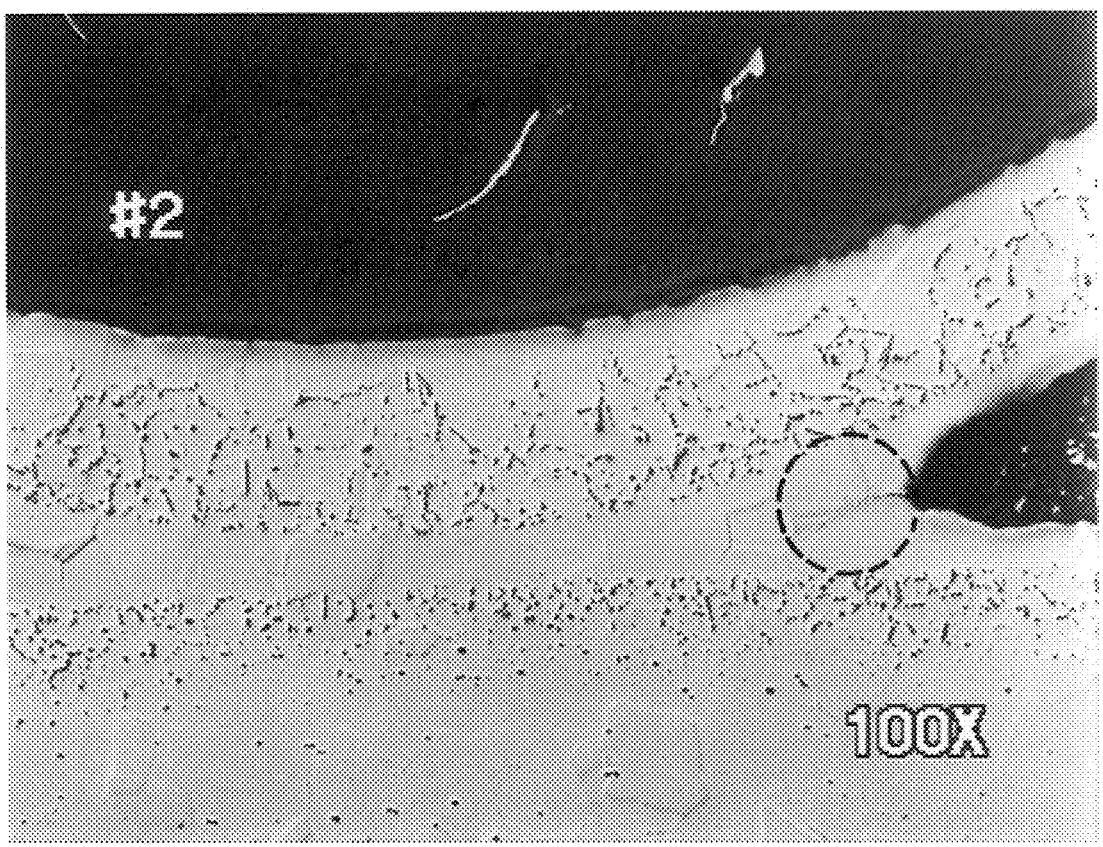
FIG. 1 is an optical micrograph of an AISI 316 stainless steel joint made using a filler metal of the present invention, the micrograph depicting a substantially uniform, single phased microstructure.

In any brazing process, the brazing material must have a melting point that will be sufficiently high to provide strength to meet service requirements of the metal parts to be brazed together. Further, the material must be compatible, both chemically and metallurgically, with the base metal parts being brazed. Also, the brazing material must be more noble than the base metal being brazed to avoid corrosion. Ideally, the brazing material should be in 100% metal containing foil form so that complex shapes may be stamped therefrom and so that brazing of complex structures can be readily accomplished. Moreover, brazing foils should be homogeneous and ductile; that is, contain no binders or other materials that would otherwise form voids or contaminating residues during brazing, and exhibit sufficient flexibility such that the foil can be bent to a round radius as small as about 10 times the foil thickness without fracture. Finally, brazing conditions should be sufficient for formation of a strong and ductile braze microstructure that is substantially free from brittle silicon/boron containing intermetallic phases.

In accordance with the present invention, multicomponent nickel-chromium-based alloys are provided which exhibit a liquidus of at least about 1090 degree(s) C, and are particularly suitable for brazing stainless steel and superalloys. The brazing filler metals have a composition consisting essentially of 0 to about 5 atom percent iron, about 9.5 to about 16.5 atom percent chromium, about 10 to about 15 atom percent silicon, about 6 to less than 7 atom percent boron, 0 to about 5 atom percent molybdenum, the balance being essentially nickel and incidental impurities. Each constituent imparts certain of the unique combination of characteristics attributed to the Ni—Cr-based alloys of the present invention. The relatively high liquidus of the alloys of the present invention results principally from the high nickel-chromium and moderate silicon-boron content in the alloys. Advantageously, brazements produced with filler metal composed of these alloys can withstand high temperature service conditions. In addition, chromium concentration of the filler metal is higher than 10 wt. %, a well known threshold value above which corrosion resistant, chromium-containing alloys develop a passive, protective film. Preferably, the amount of chromium present in the alloy ranges from about 9.5 to about 16.5 atom percent, and more preferably from about 12 to about 15 atom percent. Iron, when present in the amount of 0 to about 5, and more preferably about 1 to about 4 atom percent, improves compatibility of the filler metal with the base metal. Boron and silicon are added to enhance the ability of the alloys to exist in the amorphous form and to lower the melting point of the alloys. Individually, boron is present in the amount of about 6 to less than 7, and more preferably about 6.2 to about 6.8 atom percent, to improve amorphability and interaction between base and filler metals. The silicon content ranges from about 10 to about 15, and more preferably from about 11.0 to about 13.5 atom percent. In these amounts silicon operates to induce formation of the amorphous structure and contributes to brazeability of the filler metal. The total boron and silicon content cannot be so great as to cause excessive erosion of the base metal during brazing or to cause the excessive formation of a separate phase of brittle intermetallic compounds in the brazement. Preferably, the total boron and silicon content of the filler metal ranges from about 16 to about 22 atom percent, and more preferably ranges from 18 to about 20 atom percent.

Preferably, molybdenum is also present in an amount ranging from 0 to about 5 atom percent, and more preferably in an amount ranging from about 3.0 to about 3.5 atom percent. The role of molybdenum in the alloys of the present invention is to preserve the low melting temperature of the alloy while increasing the overall strength of the passive film forming on brazes. More specifically, molybdenum greatly reduces the incidence of pitting of brazed joints which may be formed using alloys of the present invention.

The presence of nickel in alloys of the present invention greatly improves their resistance to certain non-oxygenating corrosive media. Nickel also imparts other desired properties, such as amorphability, ductility and the like.

The alloys of the present invention can be produced in various forms, such as powders, foils, ribbons and wires by application of various well known techniques. Methods commonly used to fabricate alloys in powder form include gas or water atomization or mechanical pulverization. The most preferred method used to fabricate alloys of the present invention into foils, ribbons or wire is rapid solidification.

The alloys of the present invention exhibit a number of advantageous properties neither recognized nor disclosed heretofore. These alloys exhibit a high melting temperature, as compared to prior art nickel-chromium-based compositions, because of the low concentration of boron. In addition, the alloys exhibit low erosion of base metal and no significant diffusion problems, generally associated with high boron-containing alloys, because boron concentration is kept at a minimum. At the same time, boron concentration, coupled with sufficient silicon concentration, enables the production of a ductile and thick ribbon product by rapid solidification technology. Moreover, containing combined boron and silicon concentration at sufficient levels and keeping chromium concentration at no more than about 16.5 atom % threshold preserves the ability of the alloy to be formed in the amorphous state and to remain ductile in the ribbon shape of sufficient thickness. Finally, the alloys of the present invention do not substantially erode the base metal, thereby preserving the integrity of thin fin parts used in honeycomb and plate-type structures.

The alloys of the present invention are ordinarily produced in the form of homogeneous, ductile foils or wires by casting alloys of the above described composition using rapid solidification techniques. More specifically, the homogeneous brazing filler metals of the present invention are fabricated by a rapid solidification process which comprises forming a melt of the composition, and quenching the melt on a rotating quenching wheel at a rate of at least about $10^5$ degree(s) C per second. Such a process is disclosed in U.S. Pat. No. 4,142,571. Under these quenching conditions, a metastable, homogeneous ductile product is obtained. The metastable material may be amorphous, in which case there is no long range order as evidenced by X-ray diffraction patterns which show a diffuse halo, similar to that observed for inorganic oxide glasses. Preferably, the microstructure of alloys of the present invention contained at least 80% of amorphous phase to achieve superior ductility, and most preferably it is at least about 90% amorphous.

Foils produced by the rapid solidification process described herein are between about 65 and about 100 micrometers thick, preferably between about 68 and about 76 micrometers thick and from about 100 to 250 mm wide and more, and preferably from 150 to 200 mm wide. Because these products are homogeneous (i.e., of substantially uniform composition in all directions), brazements produce therefrom are quite uniform and substantially free of voids.

Within the broad range of the compositions of the present invention, a preferred embodiment has been discovered having a composition of about 9.5 to about 16.5 atom percent chromium, 0 to about 5 atom percent iron, about 10 to about 15 atom percent silicon, about 6 to less than 7 atom percent boron, and 0 to about 5 atom percent molybdenum, the balance being essentially nickel and incidental impurities. The alloys within this most preferred embodiment exhibit a melting temperature range of between about 960 degree(s) C and about 1200 degree(s) C and, most preferably, range from about 1030 degree(s) C to about 1130 degree(s) C. The specific advantages of these alloys include the ability to braze at reasonably high temperatures and to provide a brazement which can be employed at elevated temperature under high stress, high corrosive environment and high fatigue conditions without any significant degradation of mechanical properties.

Alloys produced in accordance with the invention are particularly suited for the brazing of stainless steel honeycomb and plate-type heat exchanger structures used in aircraft industries, power plant, food, chemical and other processing industries. In addition, the brazing process of the invention provides a marked improvement in joint mechanical strength and corrosion and fatigue resistance. This marked improvement is due to the increased holding time (preferably about 2 or more hours) at a brazing temperature of at least 50° C. higher than liquidus.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

Ribbons about 2.54 to about 200 mm (about 0.1 to about 8 inches) wide and about 68 to about 76 micrometers (about 0.0026 to about 0.003 inch) thick are formed by continually depositing a melt of each of the compositions set forth in Table 1 below, by overpressure of argon onto a rapidly rotating copper chill wheel (surface speed about 3000 to about 6000 ft/min). Metastable homogeneous ribbons having substantially glassy structure were produced. The liquidus and solidus temperatures of the ribbons described in Table 1 are determined by the Differential Thermal Analysis (DTA) technique. The individual samples are heated side by side with an inert reference material at a uniform rate, and the temperature difference between them is measured as a function of temperature. A thermogram is produced (a plot of heat-energy change vs. temperature) from which the beginning of melting and the end of melting, known respectively as solidus and liquidus temperatures, are determined. The values are reported in Table 1 below.

TABLE 1

NOMINAL (WEIGHT AND ATOMIC %*)
ALLOY COMPOSITION AND PROPERTIES

| ALLOY | Ni | Fe | Cr | Si | B | Mo | Duct. | $d_{max}$*, mil | $T_s$, °C. | $T_l$, °C. |
|---|---|---|---|---|---|---|---|---|---|---|
| 1 | bal. | — | 15 | 7.3 | 1.4 | — | yes | 2.8 | 1030 | 1126 |
|   |      |   | 14.59 | 13.14 | 6.55* |   |   |   |   |   |
| 2 | bal. | — | 15 | 5.5 | 2.8 | — | brit. | — |   |   |
|   |      |   | 14.07 | 9.55 | 12.64* |   |   |   |   |   |
| 3 | bal. | — | 16 | 7.3 | 1.4 | — | yes | 2.7 | 1036 | 1136 |
|   |      |   | 15.54 | 13.13 | 6.54* |   |   |   |   |   |
| 4 | bal. | — | 16 | 7.8 | 1.4 | — | yes | 2.6 | 1048 | 1230 |
|   |      |   | 15.47 | 13.97 | 6.51* |   |   |   |   |   |
| 5 | bal. | — | 17 | 7.4 | 1.4 | — | yes | 2.6 | 1050 | 1250+ |
|   |      |   | 16.48 | 13.28 | 6.53* |   |   |   |   |   |
| 6 | bal. | — | 18 | 7.9 | 1.4 | — | yes | 2,6 | 1036 | 1126 |
|   |      |   | 17.35 | 14.10 | 6.49* |   |   |   |   |   |
| 7 | bal. | 3 | 15 | 7.25 | 1.4 | — | yes | 2.6+ |   |   |
|   |      | 2.71 | 14.57 | 13.04 | 6.54* |   |   |   |   |   |
| 8 | bal. | 5 | 15 | 7.25 | 1.4 | — | yes | 2.7+ |   |   |
|   |      | 4.52 | 14.56 | 13.03 | 6.53* |   |   |   |   |   |
| 9 | bal. | 3 | 15 | 7.25 | 1.4 | 0.5 | yes | 2.7+ |   |   |
|   |      | 2.71 | 14.59 | 13.06 | 6.55 | 0.26* |   |   |   |   |
| 10 | bal. | 3 | 15 | 7.25 | 1.4 | 1.0 | yes | 2.7+ |   |   |
|   |      | 2.72 | 14.62 | 13.09 | 6.56 | 0.53* |   |   |   |   |
| 11 | bal. | — | 10 | 7.3 | 1.4 | — | yes | 2.7+ | 975 | 1090 |
|   |      | — | 9.77 | 13.22 | 6.58* |   |   |   |   |   |
| 12 | bal. | — | 12.5 | 7.3 | 1.4 | — | yes | 3.0+ | 1010 | 1110 |
|   |      |   | 12.19 | 13.18 | 6.56* |   |   |   |   |   |
| 13 | bal. | — | 12.5 | 7.3 | 1.4 | 3 | yes | 2.9+ | 1011 | 1112 |
|   |      | — | 12.4 | 13.41 | 6.68 | 1.61* |   |   |   |   |
| 14 | bal. | — | 15 | 7.3 | 1.4 | 3 | yes | 2.7+ |   |   |
|   |      |   | 14.77 | 13.31 | 6.63 | 1.60* |   |   |   |   |
| 15 | bal. | — | 15 | 7.3 | 1.4 | 5 | yes | 2.7+ | 1050 | 1145 |
|   |      | — | 14.83 | 13.37 | 6.66 | 2.68* |   |   |   |   |

EXAMPLE 2

Tensile test specimens are cut from AISI 316 stainless steel, in strip form. The composition of AISI 316 stainless steel is given in Table 2.

TABLE 2

AISI 316 Composition, weight %

| Fe | Ni | Cr | C | Mn | Si | Mo | Others |
|---|---|---|---|---|---|---|---|
| Bal | 10–14 | 16–18 | 0.08 | 2.0 | 1.0 | 2–3. | 075 |

The tensile specimens are dimensioned and fabricated as lap shear specimens per AWS C3.2-63. The specimens are cut perpendicularly to the length direction. The thickness is 0.3175 cm (0.125 inch). Braze joints are of the lap type, with the lap dimensions carefully controlled to 0.3175 cm (0.125 inch). Brazing specimens are degreased with benzene. Lap joints containing brazing ribbons of the invention are assembled with the ribbons side by side, the length of the lap joint.

In the case of these brazing alloys, the ribbons act as spacers. A single spot weld is used to hold the assembly together, as is a common industrial practice. A brazing alloy of the invention, an amorphous ductile ribbon of nominal composition of sample No. 1 and having dimensions 70 μm (about 0.0028 inch) thick by 12.5 mm (0.5 inch) wide is used to braze these test specimens.

Brazing is done in a vacuum furnace which is evacuated to a pressure of $1.33 \times 10^{-2}$ Pa ($10^{-4}$ Torr). The brazing conditions are outlined in Table 3. The typical microstructure of a joint after such brazing is presented in FIG. 1. The joint depicted by FIG. 1 is an AISI 316L stainless steel joint having a width of about 70 micrometers. The joint itself is uniform and has a strong and ductile single phase structure consisting of a nickel-chromium-based solid solution phase. Intermetallic silicon/boron containing phases are essentially absent from inside of the joint. Even the external fillet area (encircled in FIG. 1), which is more than twice as thick as the joint itself and contains an excessive amount of the filler metal, does not contain brittle intermetallic phases.

These brazed tensile testing specimens are subjected to tensile testing after completion of brazing procedures. The results of the testing are set forth below in Table 3.

TABLE 3

|  | Brazing Conditions | | Post Brazing Annealing | | Minimum Joint Shear Strength in the Tensile Mode | |
|---|---|---|---|---|---|---|
|  | Temp., | Time, | Temp., | Time, | | |
| Sample | °C. | min | °C. | min | MPa | ksi |
| 1 | 1155 | 10 | — | — | 55 | 7.97 |
| 2 | 1155 | 75 | — | — | 230 | 33.36 |
| 3 | 1165 | 150 | 1100 | 180 | 336 | 48.70 |
| 4 | 1175 | 150 | 1100 | 180 | 376 | 54.50 |
| 5 | 1190 | 150 | 1100 | 180 | 460 | 66.71 |
| 6 | 1190 | 250 | 1100 | 180 | 451 | 65.41 |
| 7 | 1190 | 240 | 1100 | 60 | 391 | 56.70 |

Brazes which were brazed at 1190° C. for 2.5 and 4 hours and afterwards were annealed at 1100° C. for 3 hours fail in the base metal, not in the braze. Accordingly, the values reported are lower bounds.

Having thus described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. A brazed metal article comprising an annealed base metal brazed with a filler metal, the brazed metal article having a joint shear strength measured in a tensile mode above the yield strength of said annealed base metal, the article having been brazed: (a) with a filler metal in the form of a homogeneous ductile brazing foil having at least 80% amorphous structure and a composition consisting essentially of about 9.5 to about 16.5 atom percent chromium 0 to about 5 atom percent iron, about 10 to about 15 atom percent silicon, about 6 to about 7 atom percent boron, 0 to about 5 atom percent molybdenum and the balance comprising nickel and incidental impurities; and (b) at a sufficiently high temperature and a sufficient time to produce the joint shear strength above the yield strength of the annealed base metal.

2. The brazed metal article of claim 1, wherein the foil has a composition consisting essentially of about 12 to about 15 atom percent chromium, 0 to about 5 atom percent iron, about 11 to about 15 atom percent silicon, about 6 to about 7 atom percent boron, 0 to about 3.5 atom percent molybdenum and the balance comprising nickel and incidental impurities.

3. The brazed metal article of claim 2, herein the temperature is at least about 50° C. higher than the liquidus of the filler metal and the time is at least about 2 hours.

4. The brazed metal article of claim 3 wherein the joint shear strength is at least about 336 MPa measured according to AWS C3.2-63 test method with a joint overlap equal to about the thickness of the base metal wherein the base metal is AISI 316 stainless steel.

5. The brazed metal article of claim 2 wherein the joint shear strength is at least about 336 MPa measured according to AWS C3.2-63 test method with a joint overlap equal to about the thickness of the base metal wherein the base metal is AISI 316 stainless steel.

6. The brazed metal article of claim 1, wherein the temperature is at least about 50° C. higher than the liquidus of the filler metal and the time is at least about 2 hours.

7. The brazed metal article of claim 6 wherein the joint shear strength is at least about 336 MPa measured according to AWS C3.2-63 test method with a joint overlap equal to about the thickness of the base metal wherein the base metal is AISI 316 stainless steel.

8. The brazed metal article of claim 1 wherein the joint shear strength is at least about 336 MPa measured according to AWS C3.2-63 test method with a joint overlap equal to about the thickness of the base metal wherein the base metal is AISI 316 stainless steel.

9. A brazed metal article according to claim 1 wherein the filler metal is characterized in having a melting temperature in the range of about 960° C. to about 1200° C.

10. A brazed metal article according to claim 1 wherein the filler metal is characterized in having a melting temperature in the range of about 1030° C. to about 1130° C.

* * * * *